Dec. 7, 1954 R. RADOM 2,696,519

SYSTEM AND METHOD OF ELECTRONIC ANALYSIS AND SYNTHESIS OF LIGHT IN TERMS OF COLOR AND INTENSITY

Filed May 27, 1950 2 Sheets-Sheet 1

INVENTOR.
Robert Radom
BY Hoag, Kilbourn and Carlson
ATTORNEYS.

INVENTOR.
Robert Radom
BY [signature]
ATTORNEYS.

United States Patent Office 2,696,519
Patented Dec. 7, 1954

2,696,519

SYSTEM AND METHOD OF ELECTRONIC ANALYSIS AND SYNTHESIS OF LIGHT IN TERMS OF COLOR AND INTENSITY

Robert Radom, Old Saybrook, Conn., assignor to Wesleyan University, Middletown, Conn., a corporation of Connecticut Application May 27, 1950, Serial No. 164,742

16 Claims. (Cl. 178—5.2)

This invention relates to a system for and a method of electronically analyzing a radiation spectrum, transmitting various wave forms representing the analyzed spectrum and then synthesizing those forms to reproduce the pattern of the analyzed spectrum. While of particular advantage in analyzing a color spectrum, that is, radiations limited to the frequencies of visible light, the system is applicable and useful to analyze, transmit and represent spectra of other or wider ranges of frequencies. For analysis of many spectra of certain frequency ranges such as visible light, ultra-violet or infra-red radiations the representation of the spectrum may conveniently be reproduced or synthesized upon the screen of a cathode-ray tube.

The system and method of this invention is of particular, though not exclusive, practical use in the field of television because by their use in association with other necessary and well known apparatus and methods of television transmission and reception full color television is made possible without the use of a plurality of pick-up or picture tubes or the interposition of any mechanical apparatus or optical-mechanical apparatus such as filters, mirrors or lens systems.

The system and method of this invention is also of particular practical use in the broad art of color analysis as specifically applied to analyzing, sorting and recording business records and other documents, to the detection of foreign matter in the product of manufacturing processes, to the control of chemical processes, to the control of heating and lighting processes and to other kindred colorimetric uses.

In the conventional black and white television system, the camera tube is a photo-electric device which scans and picks up the incident light wave radiation from the objective to be televised and transforms that radiation into electrical energy the intensity of which is a function of the intensity of the light wave radiation. The image of the objective is reproduced in black and white on a luminescent screen at the receiving instrument by controlling the current of an electron beam in a cathode-ray tube which impinges on the screen in accordance with these variations in intensity.

In the present invention as applied to television systems, the use of a well known principle permits production at the transmitting apparatus of modulations of a carrier wave in accordance with both the intensity of the incident light from the objective and the frequency of that light. This principle is that when a retarding field is set up before the emissive surface of the cathode of a photo-electric device, the current drawn will depend on the energy of emission of the high energy photo electrons from that cathode this being a function of the frequency of the light wave radiation reaching the photo-electric device, whereas it will not depend on the frequency of the incident light or the energy of emission when there is an accelerating field in front of the emissive surface of the cathode. Although this phenomenon has been known for a large number of years, no practical application has heretofore been made of a combination of these two functional relationships for a useful result.

It is an object of the present invention to devise a system and method which utilizes in a practical manner and for practical purposes the frequency response function of a photo-electric cell or other such device in combination with the intensity response function thereof.

It is a further object of the present invention to devise a system and method in which light wave radiations of varying frequency and intensity fall upon a photo-electric device and are selectively converted into two modulated responses, one representing frequency and one representing intensity, which are then transmitted to a suitably synchronized reception network which impresses them upon a device which combines them and transforms them back into light energy.

It is a further object of the present invention to utilize synchronized signals of opposite polarity, one representing frequency effects and one representing intensity effects, to modulate in a dual manner and continuously a high current density, high-potential cathode-ray beam arranged to scan a mixed phosphor screen of a cathode-ray tube which has phosphors of different color sensitivities and of different persistence periods.

It is a further object of the present invention to devise a system and method in which one of the elements is a luminescent screen comprising a suitable mixture of activated phosphors, each component of which is chosen for its individual and characteristically predominant frequency emission and period of persistence under selective high current density excitation by an electron beam, each component being capable of such selective excitation as a function of a distinctive unit volume concentration of its activated centers.

It is a further object of the present invention to provide a system and method which is adaptable to be used in association with a television transmission and reception system to produce the transmission and reception of full color television without the use of mechanical or optical-mechanical devices of any sort whether moving or stationary.

In the following description which comprises the drawings and specification a preferred embodiment of a simplified system and method of operation is described in which, by way of example, the radiated light waves are represented as being omitted from a point source. It is to be understood that this has been done in the interest of brevity and simplicity and it is obvious to those skilled in the art that the system and method herein disclosed may be used in apparatus where the light wave radiations received on the photo-electric device are the result of scanning a multi-colored object of finite dimensions and of varying light absorption, diffusion, refraction and reflection capabilities with a flying spot-light such as may be provided by modulating a light source with a Nipkow disc or by using a scanned projection kinescope wherein the raster of the flying spot-light is projected onto the object by any suitable means such as that disclosed in United States Letters Patent 2,537,173.

Accordingly, the present invention comprises a system and method in which emitted light waves of varying intensity and frequency are analyzed by a photo-electric device to produce signals which are impressed on alternating pulse train carriers having opposite polarities and predetermined wave forms such as saw-tooth waves and square waves; then the modulated composite wave is transmitted by any desired and well known means to a reception network in which the modulation components are impressed on the control elements of a cathode-ray tube to vary and control the high-potential beam which scans the screen thereof both with respect to current variations and current density variations. The system and method also includes scanning or raster forming means and a luminescent screen in the cathode-ray tube which like the sampling screen 2 in Fig. 1 of United States Patent 2,571,306 consists of such mixture of activated phosphors that the frequency, that is, color, of the light emission therefrom is a function of the current density of the beam where it bombards the screen and the intensity of the light emission therefrom is a function of the current of the beam.

The invention accordingly consists in the features of construction, combination of elements, arrangement of parts, and in the several steps and relation and order of each of said steps to one or more of the others thereof, all as will be illustratively described herein and the scope of the application of which will be indicated in the following claims.

In the accompanying drawings in which is shown one of the various possible embodiments of the invention Fig. 1 is a schematic circuit diagram of the system;

Figure 1:
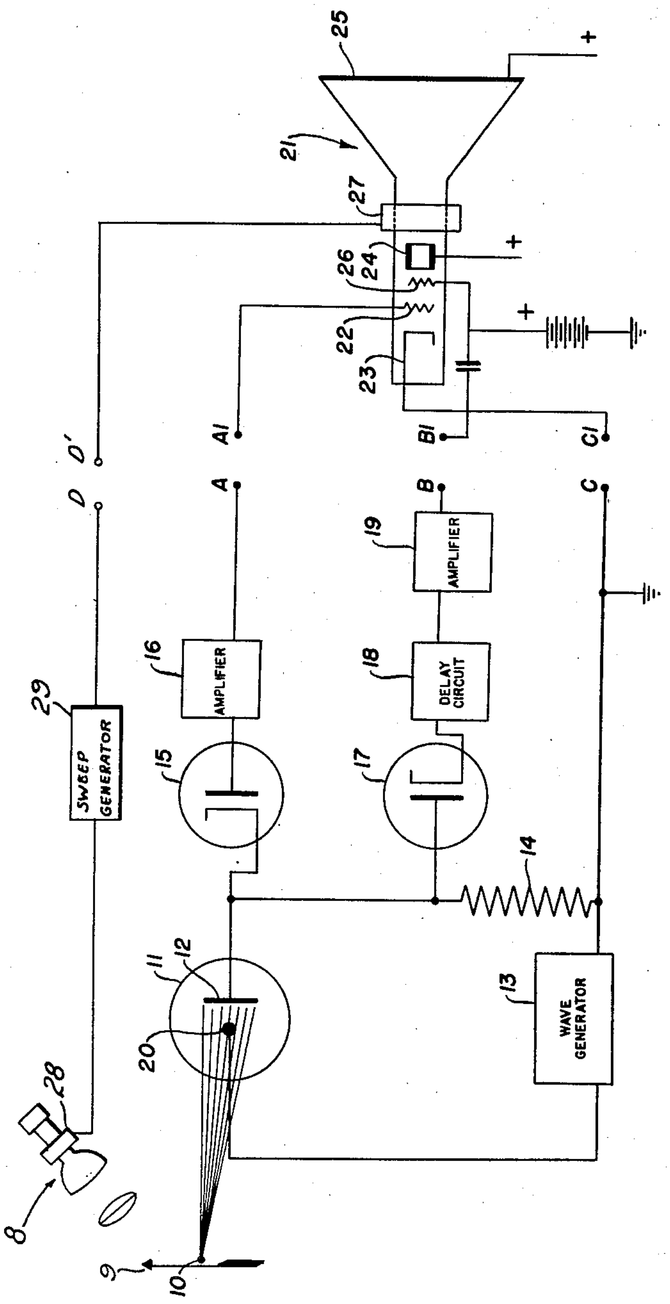

Referring to Fig. 1, 10 is a source of radiations of varying intensity and frequency which may be provided as described above by scanning an object 9 of finite dimensions with a flying spot-light. For the purpose of the following description 10 may be considered to be a source of visible light of varying intensity and color, but as above pointed out the invention is not limited to radiations of a specific or limited range of frequencies. A photo-electric cell 11 or other light sensitive device is arranged so that the radiations from source 10 fall upon its cathode 12. Photo-electric cell 11 is connected across wave generator 13, high resistance element 14 being interposed between cathode 12 and one terminal of generator 13. Generator 13 may generate an alternating wave-form of any particular shape, but preferably it should be a wave-form of saw-tooth shape for the positive portion of the cycle and of square shape for the negative portion of the cycle. In one leg of the output for the modulated compound wave generated by generator 13, there is placed half-wave diode rectifier 15 followed by half-wave amplifier 16 of any conventional design suitable for the frequencies and wave-form involved. Thus, as is seen from Fig. 4, there is present at terminal A only the negative portion of the wave. A second leg of the output includes half-wave diode rectifier 17, phase changing, or delay circuit 18, and half-wave amplifier 19, all of which may be of any suitable conventional design. Delay circuit 18 is designed to delay the rectified wave 180° with the result that the form of the wave present at terminal B is that shown by Fig. 5. The lower end of resistor 14 is connected to terminal C which may conveniently be at ground potential.

If no light wave radiation strikes cathode 12 no photo-electrons are emitted therefrom. However, if light does strike cathode 12 it may emit electrons and current may flow from anode 20 to cathode 12 depending on whether their initial velocities are aided by the potential between cathode and anode or hindered thereby and, if the latter, to what extent. When there is an accelerating potential on cathode 12, that is, when it is negative with respect to anode 20, all of the emission from cathode 12 will be collected by anode 20 and the resultant tube current will vary in direct proportion to the intensity of the light. The potential across resistor 14 will vary similarly. However, when there is a retarding potential on cathode 12, that is, when it is positive with respect to anode 20, the current drawn will also depend on the energy of the emitted photo-electrons, this being a linear function of the light striking it.

The function of emission in terms of wave length is expressed by the equation $$\frac{\delta v}{\delta \mu}=\frac{h}{c}$$

where $\delta v$ is the change in maximum energy of the emitted electrons expressed in volts, $\delta \mu$ is the change in wave length of the incident light expressed in angstrom units, $h$ is Planck's constant, and $c$ is the elementary electron charge constant. This curve is reproduced as Fig. 2 and shows how a 100% retarding potential must be of progressively larger magnitude for progressively shorter wave lengths of the light impinging on cathode 12.

Figure 2:
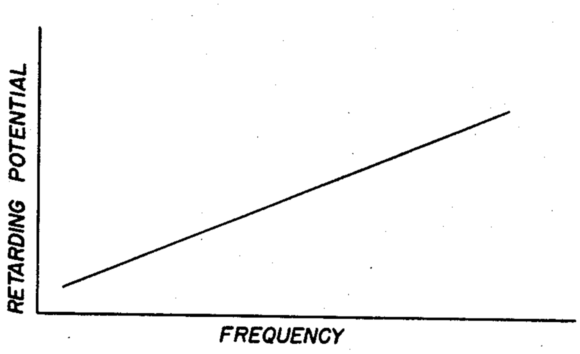
Fig. 2 is a curve showing the frequency response characteristic of a photo-electric cell with a retarding potential on the cathode.

Wave generator 13 is designed to have a wave-form in which the positive or retarding portion of the cycle has a slope substantially the same as that of the curve shown in Fig. 2. Thus during this half of the cycle the retarding potential at any particular point along the saw-tooth is of such value that no electrons except those resulting from incident radiation of more than a particular frequency can pass to anode 20. The intensity of the incident light at a given frequency is immaterial because for a given frequency of the incident light the initial velocities of the electrons that are emitted is constant for all intensities within practical operative limits. Thus the positive portion of the cycle of the wave generated by wave generator 13 can be modulated by signals having a characteristic solely representing variations in the upper frequency limit of the incident light.

The preferable wave form for the negative or accelerating portion of the cycle of the wave generated by wave generator 13 is a square wave. However, other wave forms may be used when conditions make such use desirable. Since the number of the emitted electrons from cathode 12 is a direct function of the intensity of the incident light when an accelerating potential is applied to cathode 12, intensity variations will modulate the negative portion of the cycle of the wave generated by generator 13 and this portion of the wave will not be affected by changes in frequency of the incident light since frequency does not affect the volume of emission when there is an accelerating potential on the cathode.

Figure 3:
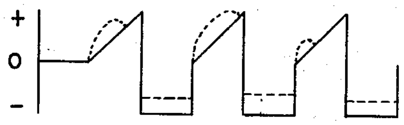
Fig. 3 is a diagrammatic representation greatly exaggerated of an example of the wave form at the output of the wave generator in the analyzer or transmitter portion of the system.
Figure 5:
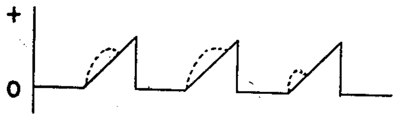
Fig. 5 is a diagrammatic representation greatly exaggerated of an example of the wave form at the positive potential terminal designated as B on Fig. 1 of the analyzer or transmitter portion of the system.
Figure 4:
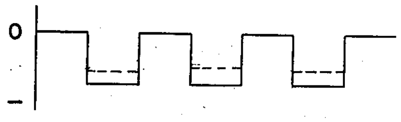
Fig. 4 is a diagrammatic representation greatly exaggerated of an example of the wave form at the negative potential terminal designated as A on Fig. 1 of the analyzer or transmitter portion of the system.

Therefore it is seen that the positive portion only of the cycle of the wave generated by generator 13 is modulated by frequency variations of light source 10 and the negative portion only is modulated by intensity variations of light source 10. The unmodulated wave form of the output of generator 13 and the potential across resistor 14 is represented by a solid line and the same wave form after it has been modulated, by the algebraic addition thereto of the signal component, with a dotted line as is shown in Fig. 3 and the negative and positive portions of the wave will occur respectively at terminals B and A as is shown in Figs. 4 and 5.

Terminals A, B and C may be connected to additional power amplifiers the outputs of which are fed to an antenna array for transmission through space to one or more receiving stations or they may be directly connected or connected through transformers to a reception network and cathode-ray tube to constitute a so-called closed system. The former arrangement is obviously advantageous for television transmitting and telecasting whereas the latter arrangement is of special use in colorimetric and laboratory work.

In the interest of simplicity light source 10 has been considered simply as a point source of varying intensity and light frequency or hue. It is to be understood, however, that, as indicated above, the present invention may readily be applied to analyzing the color variations as well as the intensity variations of the incident light which is reflected from or transmitted through a live objective of larger area after being projected thereon or therethrough by a scanning means for covering such objective such as a flying spotlight.

Another possible arrangement that suggests itself is the replacement of a simple photo-electric cell by an image dissector type of pick-up device in which the electron image on the cathode is formed and projected on a plane parallel to the cathode and including the anode and then that projected image is swept by electrostatic or electromagnetic means or a combination of both across an aperture formed to permit portions of the area of the projected image to strike the anode until the entire image is scanned. It is to be understood that the size of this aperture should in general correspond to the area of the picture element. During this scanning there is impressed upon the cathode an alternating accelerating and retarding voltage so that, as above explained, the color values as well as the intensity values of each picture element of the image is impressed upon the device and can be separately rectified as above explained.

Corresponding input terminals $A_1$, $B_1$, and $C_1$ are located at the receiver portion of the system. If this system and method is applied to a color television transmission system, there will be additional elements all of which are of conventional design and therefore are neither shown nor described herein such as amplifiers, wave generators, differentiating circuits, synchronizing circuits and the like interposed between terminals $A_1$, $B_1$ and $C_1$ and the respective elements of cathode-ray tube 21 to which they are ultimately attached.

Terminal $A_1$ is connected through various suitable circuit elements, such as a demodulator and a video-amplifier, which are not shown here because they may be of conventional design, to grid 22 of cathode-ray tube 21. Grid 22 is arranged between cathode 23 and anode 24 of cathode-ray tube 21 to control the current of the electron beam emitted from cathode 23 and impinging on luminescent screen 25. Terminal $B_1$ is connected through other suitable circuit elements, not shown because they are of conventional design, to a focusing electrode 26 arranged between grid 22 and anode 24 to control the cross-sectional area of the electron beam emitted from cathode 23 and impinging on screen 25. In controlling the cross-sectional area of the electron beam, electrode 26 controls continuously the current density of the electron beam as it scans the screen since its current density is a function of the cross-sectional area of the beam. Terminal $C_1$ is connected, again through various suitable conventional circuit elements, to cathode 23 of cathode-ray tube 21. Scanning means for the electron beam in cathode-ray tube 21 are diagrammatically represented as deflection yoke 27.

Where the present invention is to be employed in a closed system, a common sweep generator, such as the generator 29 shown in Figure 1 may be employed to energize deflection yokes 27 and 28 of both cathode-ray tube 21 and projection kinescope 8. However, as will be understood by those familiar with the art, a separate generator will be required for the transmitting station and for each receiving station if the video information is to be transmitted to the latter on electromagnetic carrier waves. In such a case synchronization signals should be derived from the sweep generator of the transmitting station so that they can be added to the brightness and hue representing video signals to provide a composite video signal for modulating the carrier wave.

The design of and all of the connections to yoke 27 are not shown in detail herein because they are conventional and well understood in the art. It is to be understood that yoke 27 may represent two pairs of coils for tubes using electromagnetic deflection or two pairs of plates for tubes using electrostatic deflection. A relatively high direct potential of the order of 30,000 volts is applied to screen 25 of cathode-ray tube 21. The direct voltage applied to anode 24 is considerably higher than that usually applied to similar tubes for ordinary purposes thus, by way of example, if the conventional potential applied to this anode is in the neighborhood of say 9000 volts, in practising this invention, for the reasons stated below, a potential of 12,000–13,000 should be applied to anode 24. The circuits for applying voltages to anode 24 and screen 25 are not shown since they may be of well known and conventional design.

It is thus seen that the wave form existing at terminal A, whether that terminal is directly connected to terminal $A_1$ or whether transmission from A to $A_1$ is accomplished through propagation of waves through space, exists at the same instant (disregarding the infinitesimal time needed for transmission) at terminal $A_1$ and controls the current of the beam in cathode-ray tube 21. Similarly the wave form at terminal B, through the connections of terminal $B_1$ to grid 26, controls the current density of that beam. Therefore, as the beam is scanned across screen 25 it is controllably varied in current magnitude and current density.

Screen 25 is made up of a generally homogeneous mixture of materials, it thereby being much easier and much less expensive to make than such composite types as line-phosphor and dot-phosphor screens. The mixed materials may be inorganic substances, such as the mixture of zinc sulfide and beryllium silicate described in the above mentioned United States Patent 2,571,306, that are capable of the phenomenon of luminescence and which are commonly known as activated phosphors. In the conventional use of a cathode-ray tube having mixed phosphor screens the maximum current density where the beam impinges on the screen is limited because, if the current density is too high at this point, the image reproduced on the screen loses its monochromatic characteristic which loss is an undesirable effect for the purpose of producing a black and white image. In practising the present invention the current density of the beam in the cathode-ray tube is appreciably increased over that which would give most satisfactory performance for a given mixture of phosphors for monochromatic luminescence and to the point where one or more but not all of the ingredients of the mixture will be saturated. Polychromatic luminescence of the screen is made possible by this increase in current density since subsequent modulations in the beam's density will cause unequal changes in the relative magnitudes of different components of the light emitted by the screen thereby changing the color of the total mixed emissions. It is a generally accepted theory that the structure of a luminescent screen which consists of a generally homogeneous mixture of various inorganic materials such as silicates, sulphides and other similar compounds which have been activated by the presence of quantities, sometimes relatively small, of activating agents such as manganese, tin, and other metals contains distributed throughout its mass extremely small particles of the activating agent generally known as active centers. When bombarded by an electron beam the electrons associated with these active centers are exerted to higher energy levels by the absorption of energy from the beam. As the active center returns to the ground state it emits light and will continue to do so until the active center has returned to ground potential. The time required for such phosphor to return to ground potential, known as the persistence time or period, varies for each phosphor. It is also generally known that each class of phosphors tends to emit light more readily over a specific band of frequencies than over other frequencies. It follows therefore, that if the phosphors for the screen mixture are chosen to have different persistence periods and different characteristic color emissions and if modulations of the type disclosed herein are impressed on an electron beam of relatively high current density, they will be effected to vary differently the individual color components and therefore to vary any instantaneous mixtures thereof. While the above is believed to be the correct theory of polychromatic luminescence, it is to be understood that the theory forms no part of the present invention, but that the invention resides in the proven ability to control the colors and color combinations of the luminescence of a screen mixture of properly chosen materials by varying the current density of the electron beam scanning the screen.

*Operation*

During each positive half-cycle of the output of generator 13 photo-electric cell 11 will draw current starting at the beginning of the saw-tooth wave and continuing until the point where the wave has attained a sufficient magnitude to repel the highest energy photo-electrons then being emitted by cathode 12. For example, if during any saw-tooth wave, light source 10 should emit light including components having the shortest wave length which the apparatus is arranged to receive, a current pulse will be drawn by photo-electric cell 11 during all of that half cycle. The current pulses produced during these half-cycles, whatever their durations, will be added to, that is, will increase the amplitude of the saw-tooth waves. Thus in the illustrative case just mentioned a square wave will be added to the saw-tooth wave from the beginning to the end thereof. This modulating increment may readily be deleted at a later point in the system in accordance with well known electronic techniques and the result will be one square wave for each saw-tooth wave whose duration represents the frequency of the highest frequency component of the light received by photo-electric cell 11 during the interval of that particular saw-tooth wave. Therefore, over a period of many cycles the modulating component of the positive half-cycles of the output of generator 13 will be a train of pulses the widths of which vary in accordance with the variations in the upper frequency limit of the varying spectrum of light components being received from source 10 as it is scanned over object 9.

During negative half-cycles of the output of generator 13, photo-electric cell 11 will draw current pulses, all of which have the duration of an entire half-cycle and each of which will have a magnitude proportional to the intensity of the light received by photo-electric cell 11 during a particular half cycle. Each of these current pulses will produce a voltage drop across resistor 14 which will reduce the amplitude of the half-wave then being produced by generator 13. Thus upon appropriate demodulation, the signal component which will be recovered, this also being possible in accordance with well known electronic techniques, will consist of a train of square waves of uniform durations whose amplitudes vary in accordance with variations in the intensity or brightness of the received light.

When the signal square waves, originally modulating the positive half-cycle, of varying durations are applied to focusing electron 26 each of them will cause a change in the color of the light emitted by screen 25, for reasons described in United States Patent 2,571,306 already referred to, for a period of time depending on its duration. Since in each complete cycle some light of changed color and some of unchanged color will be emitted, the hue of the mixed light emitted during the cycle will depend upon the duration of the focus-modulating square wave. The range over which the hue of the mixed light can be varied in this manner can be extended by selecting, for the saturating and non-saturating components of the mixed screen, phosphors having appropriately different response and decay periods.

Although some embodiments of the present invention may not reproduce identically all of the hues of the object, color for color, due to the fact that the response of photo-electric cell 11 is related solely to the frequency of the highest frequency component of the light yet they will represent differences in hue. In other words, the video representations produced on the screen of the picture tube will contain information relating to variations in hue as well as in brightness and for many purposes this information is extremely valuable. For example, consider an embodiment in which the light provided by kinescope 8 extends over a broad portion of the ultra-violet region of the spectrum and the object 9 is a biological specimen, such as a slice of tissue, different parts of which may have different densities and therefore different absorption, reflection and transmission properties. As a result some parts may have the effect of causing only the most energetic short wave components of the ultra-violet light to reach the photo tube 21 whereas others will cause components having a wide spectral distribution to do so. Thus an image will be produced on screen 25 which will be most informative in that different types of tissues will be depicted in different colors.

In such use of the apparatus it is not essential that the light be applied to the specimen in the form of a small spot which is finely focused and scanned and is projected on the viewed (front) surface of the specimen. Instead, if desired, and by using a dissector tube (as suggested at line 18, page 9 herein) instead of a photodiode one may flood the entire back of the specimen with penetrative ultra-violet light and, for example, use a projection microscope to receive any light which emerges from the front surface of the specimen and to project it in the form of an enlarged image onto the photocathode of the dissector tube. As is known, such a system will have greater definition capabilities than conventional microscopes due to the reduced wave lengths of the light used for illuminating the object.

I claim:

1. In a system for analyzing a radiation spectrum, a radiation sensitive device comprising a cathode and an anode the cathode of which is exposed to the radiations of said spectrum, means for generating a repeated voltage wave providing alternating photoelectron retarding and accelerating potentials, means for impressing between said anodes and said cathodes said periodically repeated voltage wave providing alternately photo-electron retarding and accelerating potentials whereby said wave will be modulated in accordance with pulses of current drawn by said device and a pair of oppositely polarized means individually connected to said device for rectifying separately alternate half-cycles of said waves.

2. In a system for analyzing radiations from a source of light of varying frequencies and intensities, a light sensitive device comprising a cathode and an anode and cathode of which is exposed to said radiations, means for generating an alternating electric potential, means for impressing said potential between said anode and said cathode a periodically repeated voltage wave providing alternating photo-electron retarding and accelerating potentials whereby said wave will be modulated in accordance with pulses of current drawn by said device and a pair of oppositely polarized means individually connected to said device for rectifying separately alternate half-cycles of said waves.

3. In apparatus for producing a signal capable of conveying intelligence both with respect to the frequency of radiations and intensity of radiations of a radiation source, a photo-electron emissive device exposed to said radiations, means for periodically impressing a variable photo-electron retarding voltage on said device, means for periodically impressing a photo-electron accelerating voltage on said device, rectifying means for rectifying the output of said device while said retarding voltage is impressed upon it and separate means for rectifying the output of said device while said accelerating voltage is impressed upon it.

4. In apparatus for producing television signals conveying information both as to the colors and intensities of an objective to be televised, a circuit including a photo-electric cell, comprising an electron emissive cathode and an anode, disposed to receive radiations from said object on its cathode, a wave generator connected across said cathode and anode said generator designed to produce an alternating potential having in general a saw-tooth form during its positive half-cycle and in general a square wave form during its negative half-cycle, a high resistance between said cathode and said generator, separate and independent half-wave rectifiers connected across the output of said circuit, amplifying circuits in the outputs of said rectifiers and a delay circuit in one of said output circuits.

5. In a color television transmitter, a photo-electric cell adapted to receive from the field to be televised light which is projected thereupon by a flying spot-light scanning the field, a circuit comprising a wave generator connected across the electrodes of said photo-electric cell and adapted to impress a substantially linearly increasing positive voltage on the cathode of said photo-electric cell alternately with a negative voltage of substantially constant magnitude on said cathode and a relatively high resistance between said cathode and said wave generator, separate half-wave rectifiers connected across the output of said circuit and circuit connections including a delay circuit in series with one of the rectifiers for individually connecting said rectifiers to terminals adapted for connection to video signal utilization means.

6. The method of transmitting and receiving in full color images by television comprising analyzing the light values of the objective to be televised separately both as to frequency and intensity, modulating the positive half-cycle of a carrier wave in accordance with the variations in frequency of said light, modulating the negative half-cycle of said carrier wave in accordance with the variations in intensity of said light, separately rectifying each half-cycle of said carrier wave, impressing the modulation component of each of said rectified half-cycles on separate control elements of a cathode-ray receiving tube having a picture screen consisting of a mixture of activated luminescent materials and controlling from one of said control elements the color of the luminescence of said screen by said rectified positive half-cycle while controlling from the other of said control elements the intensity of the luminescence of said screen by said rectified negative half-cycle.

7. The method of transmitting and receiving images of varying color and intensity comprising exposing the cathode of a photo-electric device to light radiations from the object the image of which is to be transmitted, impressing an alternating voltage between the cathode and anode of said photo-electric cell, separately rectifying the half-cycles of said voltage and controlling the colors of the luminescence of the screen of a cathode ray tube by impressing upon a control element thereof the modulation component of the rectified one-half cycle of said voltage and the intensity of said luminescence by impressing upon another control element thereof the modulation component of the rectified other half-cycle of said voltage.

8. In a system for producing, transmitting and receiving television images in color, in the transmitting apparatus thereof, a photo-electric cell adapted to receive from the subject to be televised light which is projected thereupon by a flying spot-light scanning the subject, a circuit comprising a wave generator connected across the electrodes of said photo-electric cell and adapted to impress a substantially linearly increasing positive voltage on the cathode of said photo-electric cell alternately with a substantially constant negative voltage on said cathode and a relatively high resistance between said cathode and said wave generator, separate half-wave rectifiers connected across the output of said circuit and circuit connections including a delay circuit connecting said rectifiers to terminals adapted for connection to an antenna circuit and an antenna and, in the receiving apparatus thereof, an antenna circuit adapted to receive signals from said antenna in said transmitting apparatus, a cathode-ray tube having an electron beam and a luminescent screen upon which said beam impinges consisting of a mixture of luminescent materials each of said materials having the characteristic of exhibiting increased luminescent activity over a particular band of light frequencies different from the bands of light frequencies over which the others of said materials exhibit increased luminescent activity when the current density of said beam is increased and each of said materials having an appreciably different persistence period from that of the others of said materials, circuit connections from said antenna circuit to one of said electrodes for controlling the current density of said beam in accordance with the frequencies of the colors of the transmitted image and circuit connections from said antenna circuit to the other of said control electrodes for controlling the magnitude of the current comprised of the electrons in said beam in accordance with the intensities of the transmitted image.

9. In a system for producing, transmitting and receiving television images in color, in the transmitting apparatus thereof, a photo-electric cell adapted to receive from the subject to be televised light which is projected thereupon by a flying spot-light scanning the subject, a circuit comprising a wave generator connected across the electrodes of said photo-electric cell and adapted to impress a substantially linearly increasing positive voltage on the cathode of said photo-electric cell alternately with a substantially constant negative voltage on said cathode and a relatively high resistance between said cathode and said wave generator, separate half-wave rectifiers connected across the output of said circuit and circuit connections including a delay circuit connecting said rectifiers to terminals adapted for connection to an antenna circuit and an antenna and, in the receiving apparatus thereof, an antenna circuit adapted to receive signals from said antenna in said transmitting apparatus, circuit connections between said antenna circuit and a first control element for varying the current density of an electron beam in a cathode-ray tube in said receiver where said beam impinges on the screen of said tube and between a second control element for varying the magnitude of the current comprised at which the electrons in said beam impinge upon said screen.

10. In a system for producing, transmitting and receiving television images in color, in the transmitting apparatus thereof, a photo-electric cell adapted to receive from the subject to be televised light which is projected thereupon by a flying spot-light scanning the subject, a circuit comprising a wave generator connected across the electrodes of said photo-electric cell and adapted to impress a substantially linearly increasing positive voltage on the cathode of said photo-electric cell alternately with a substantially constant negative voltage on said cathode and a relatively high resistance between said cathode and said wave generator, separate half-wave rectifiers connected across the output of said circuit and circuit connections including a delay circuit connecting said rectifiers to terminals adapted for connection to an antenna circuit and an antenna and, in the receiving apparatus thereof, an antenna circuit adapted to receive signals from said antenna in said transmitting apparatus, a cathode ray tube having a luminescent screen and an electron beam adapted to impinge thereupon and travel thereacross, a first control element in said tube for varying the current density of said beam when it impinges upon said screen a second control element in said tube for varying the magnitude of the current comprised at which the electrons in said beam impinge upon said screen, circuit connections from said antenna to said first control element for impressing thereupon variations in accordance with the colors of the object televised by said transmitting apparatus and circuit connections from said antenna to said second control element for impressing thereupon variations in accordance with the intensity of the light reflected by said televised object.

11. The method of reproducing a polychromatic image on the screen of a cathode-ray tube comprising impressing a signal carrying color information and a signal carrying intensity information each on a control element of said tube, producing an electron beam bombarding said screen said beam being of relatively high current density, varying the current density of said beam in accordance with the frequencies of the colors of said signal carrying color information by means of one of said control elements and simultaneously varying the magnitude of the current comprised of the electrons in said beam in accordance with the signal carrying intensity information by the other of said control elements.

12. In a cathode-ray receiving tube, means for producing a multi-color image on the screen of said tube comprising a single layer coating forming said screen and consisting of a mixture of light emitting compounds each of which is more emissive over one band of light frequencies than for light of other frequencies and one of which saturates more readily than any other, control means for varying the current density of the electron beam in said tube with a train of pulses whose durations vary in accordance with the frequencies of the light values of the signal impressed on said tube whereby the colors resulting from said electron beam impinging on said screen and the image produced thereby correspond to the colors of the received signal.

13. In combination in a television receiving set, a cathode-ray receiving tube having an electron beam and means for producing it, at least two electrodes to control the characteristics of said beam and a luminescent screen upon which said beam impinges consisting of a single layer of a mixture of luminescent materials each of said materials having the characteristic of exhibiting increased luminescent activity over a particular band of light frequencies different from the bands of light frequencies over which the other of said materials exhibit increased luminescent activity when the current density of said beam is increased, and each of which has a persistence period of different length, circuit connections to one of said electrodes for controlling cyclically the current density of said beam in accordance with the frequencies of the colors of the received image and circuit connections to the other of said control electrodes for controlling the magnitude of the current comprised of the electrons in said beam in accordance with the intensities of the received image.

14. The system of claim 1 in which each of the retarding potentials impressed between said cathode and anode by said generating means increases substantially linearly in amplitude with time for the duration of its respective half-cycle.

15. The system of claim 2 in which each of the retarding potentials impressed between said cathode and anode by said generating means increases substantially linearly in amplitude with time for the duration of its respective half-cycle.

16. The method of analyzing radiations of light frequencies of varying frequencies and intensities comprising impressing said radiations on the cathode of a photo-electric device, applying an electric potential on said cathode to set up, alternately, a linearly varying retarding electrostatic field and a substantially constant accelerating electrostatic field before the emissive surface of said cathode and modulating said alternately applied potentials in accordance with the pulses of electric current drawn by said device.

References Cited in the file of this patent

UNITED STATES PATENTS

| Number | Name | Date |
|---|---|---|
| 2,103,847 | Hansell | Dec. 28, 1937 |
| 2,262,764 | Hull | Nov. 18, 1941 |
| 2,375,966 | Valensi | May 15, 1945 |
| 2,416,056 | Kallmann | Feb. 18, 1947 |
| 2,455,710 | Szegho | Dec. 7, 1948 |
| 2,492,926 | Valensi | Dec. 27, 1949 |
| 2,537,173 | Szegho | Jan. 9, 1951 |

OTHER REFERENCES

"Photoelectric Phenomena" by Hughes and Du Bridge—McGraw-Hill, 1932, chapter II, pages 7 to 37.